United States Patent
Mitts et al.

[11] Patent Number: 5,940,371
[45] Date of Patent: Aug. 17, 1999

[54] MAINTAINING THE COMPOSITION OF TRANSFERRED DATA DURING HANDOVER

[75] Inventors: Håkan Mitts, Helsinki; Jukka Immonen; Harri Hansen, both of Espoo, all of Finland

[73] Assignees: Nokia Mobile Phones Ltd., Salo; Nokia Telecommunications Oy, Espoo, both of Finland

[21] Appl. No.: 08/736,047

[22] Filed: Oct. 22, 1996

[30] Foreign Application Priority Data

Dec. 1, 1995 [FI] Finland ................................. 955812

[51] Int. Cl.⁶ .............................. H04B 7/26; H04L 12/56
[52] U.S. Cl. ........................ 370/236; 370/331; 370/349; 370/397; 455/436
[58] Field of Search ..................... 370/328, 329, 370/331, 338, 349, 350, 395, 396, 397, 400, 401, 409, 905, 913, 235, 236; 455/422, 436, 442, 445, 450, 507, 509, 517, 524

[56] References Cited

U.S. PATENT DOCUMENTS

| | | | |
|---|---|---|---|
| 5,305,308 | 4/1994 | English et al. | 370/286 |
| 5,345,448 | 9/1994 | Keskitalo | 370/331 |
| 5,359,603 | 10/1994 | McTiffin | 370/395 |
| 5,371,738 | 12/1994 | Moelard et al. | 370/331 |
| 5,384,826 | 1/1995 | Amitay | 455/436 |
| 5,410,733 | 4/1995 | Niva et al. | 455/437 |
| 5,420,863 | 5/1995 | Taketsugu et al. | 370/349 |
| 5,434,853 | 7/1995 | Hemmady et al. | 370/331 |
| 5,434,854 | 7/1995 | Focarlie et al. | 370/338 |
| 5,483,668 | 1/1996 | Malkamaki et al. | 455/442 |
| 5,487,065 | 1/1996 | Acampora et al. | 370/331 |
| 5,524,009 | 6/1996 | Tuutijarvi et al. | 370/332 |
| 5,553,069 | 9/1996 | Ueno et al. | 370/329 |
| 5,583,859 | 12/1996 | Feldmeier | 370/471 |
| 5,590,125 | 12/1996 | Acampora et al. | 370/329 |
| 5,722,074 | 2/1998 | Muszynski | 370/331 |
| 5,757,783 | 5/1998 | Eng et al. | 370/394 |
| 5,774,461 | 6/1998 | Hyden et al. | 370/329 |
| 5,802,050 | 9/1998 | Petersen et al. | 370/394 |
| 5,805,580 | 9/1998 | Vercauteren et al. | 370/331 |

FOREIGN PATENT DOCUMENTS 0 660 632 A2  6/1995  European Pat. Off. .

OTHER PUBLICATIONS

ICC'95, Communications—Gateway to Globalization, Jun. 1995, "BAHAMA: A Broadband Ad–Hoc Wireless ATM Local–Area Network", K.Y. Eng. et al., p. 1218, col.1, line 4–line 10; p. 1218, col. 1, line 36–col. 2, line 9; p. 1219, col. 1, line 18–28; p. 1219, col. 1, line 43–col. 2 line 3.

*Primary Examiner*—Alpus H. Hsu
*Attorney, Agent, or Firm*—Perman & Green, LLP

[57] ABSTRACT

In a radio data transmission system which transmits data in cell form, the risk of cell loss or the risk of out-of-ordering during handover can be diminished by synchronizing the cell transmission between the new (50) and the old (40) base stations. The old base station (40) delivers to the new base station (50) and/or the switch (51), information on the last cell that was transmitted successfully and in the right order through the old base station, whereby the new base station continues the transmission by starting from the first failed cell. Cells need not be identified one by one if group numbering is applied in which the first or the last cell of a given group (31, 32, 33, 34) or a given counter cell is numbered, and the rest can be indicated, where necessary, by counting the distance from the numbered cell.

18 Claims, 8 Drawing Sheets

MAINTAINING THE COMPOSITION OF TRANSFERRED DATA DURING HANDOVER

BACKGROUND OF THE INVENTION

1. Field of the Invention

The invention generally relates to procedures aimed at maintaining the reliability of data transmission in wireless telecommunications systems comprising several base stations, and in particular to maintaining the composition of the data carried in data cells during a handover in a system which transfers data as data cells whose relative order is significant.

2. Prior Art

The ATM (Asynchronous Transfer Mode) is a strong candidate for a fast future transfer protocol in B-ISDN networks (Broadband Integrated Services Digital Network), for example, and generally in communications between data transmission devices. The network consists of nodes and terminals, and of links between them. In an ATM network, data is transferred as cells in digital form, each cell comprising a so-called payload of 48 bytes and a header of 5 bytes. In order for the amount of the header information to be kept at a minimum, the headers do not contain complete routing information between the transmitting and the receiving devices but only information on the virtual path and channel in which the respective data transfer connection is carried. The nodes of the network contain the necessary routing information on the basis of which the respective identifiers of the virtual path and channel are interpreted as a reference for the next respective node. The relative order of the cells must remain the same throughout the transmission because there is no specific mechanism in the ATM network that can be used to rearrange out-of-order cells.

Traditionally, ATM-links have been conceived as wired circuits or optical cable connections, whereby the above-mentioned requirement of the relative order of the cells has not caused major problems. However, it is anticipated that the terminals of future data transfer solutions must have the same kind of mobility and independence of permanent connections as mobile phones of cellular networks already have. Because of its effectiveness and the provision to flexibly modify it, the cellular radio network is a likely architecture in the future. A typical cellular network comprises several base stations (BS) which are affiliated with— possibly through a base station controller (BSC)—a mobile switching center (MSC). In a large cellular network there are numerous mobile switching centers as well as base stations and base station controllers that work under the mobile switching centers. The transmission range of each base station, i.e., the geographical area where the terminals can communicate wirelessly with the said base station, is called a cell.

However, to avoid confusion, the term cell is in this patent application used to refer only to the transferred data unit defined by a given data transmission system, the length of the unit being the above-mentioned 53 bytes in the ATM system which is used as an example.

A typical phenomenon of cellular systems is the change of base stations, i.e., the handover, where a given mobile terminal moves from the transmission range of a first base station to that of a second base station, whereby essentially all the data transmission between the terminal in question and the network is rerouted through the new base station. A perfect synchronization of the operation during the handover is often not possible, which may result in packet loss, duplication or misordering. This is especially severe in the ATM system where a successful transmission of all the cells and ordering are a prerequisite for effective data transmission.

A handover may take place without a notice or with a notice. The former refers to a situation where the connection between the base station and the terminal breaks quickly and the latter implies that, where the connection worsens gradually, one can prepare for procedures required for handover. The doctoral thesis of S. K. Biswas "Handling Realtime Traffic in Mobile Networks" (University of Cambridge, September 1994) discloses procedures for implementing a handover both without a notice and with a notice. In order to explain the background of the invention, the handover of base stations is described briefly in the following with reference to FIGS. 1 and 2.

Figure 1:
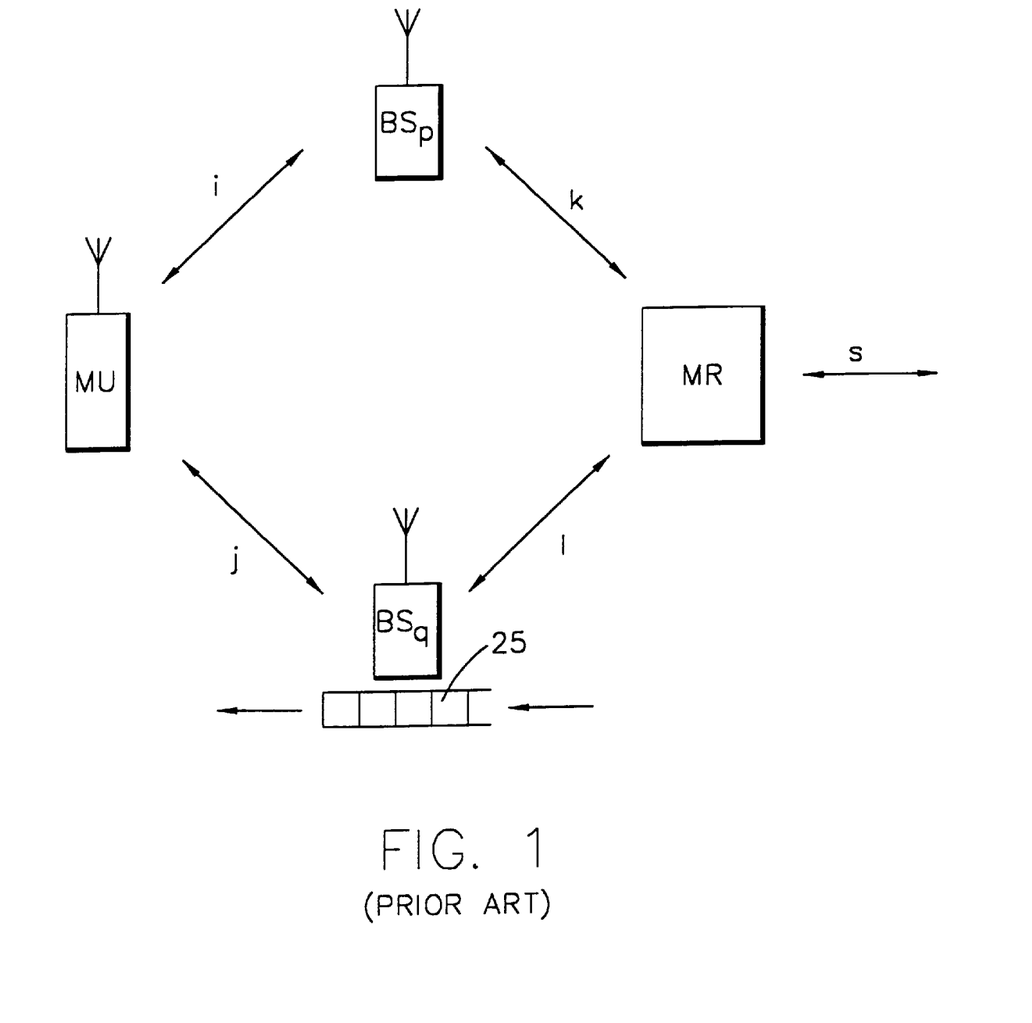
FIG. 1 presents a known data transmission system with two base stations.

FIG. 1 presents the mobile unit MU, two base stations BSp and BSq, and mobile representative MR which is in charge of routing the traffic between the said base stations and the rest of the data transmission network. In addition, the data transfer segments between the said devices are designated letters i, j, k, and l. The data transfer segment directed from mobile representative MR to the rest of the network is designated s. The data directed from mobile unit MU to the network is called uplink data and the data propagating in the opposite direction is called downlink data.

Figure 2:
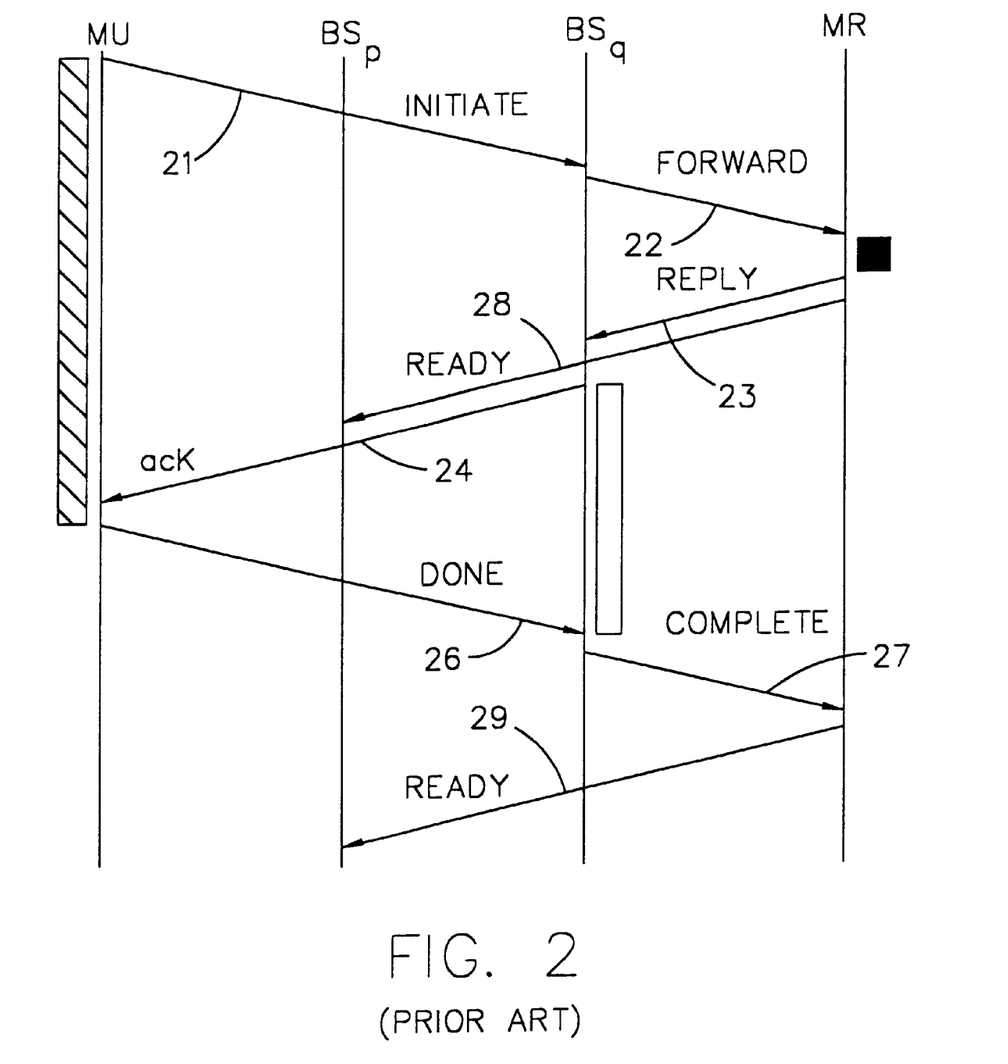
FIG. 2 presents a known data transmission protocol in the data transmission system of FIG. 1.

FIG. 2 presents signals between the said devices by means of numbered arrows, relating to the handover with a notice in which BSp is the old base station and BSq is the new base station. Mobile unit MU stops transmitting uplink cells along segment i and transmits initiate message 21 to new base station BSq. BSq transmits forward message 22 to mobile representative MR on the need to reroute. As a response, mobile representative MR stops sending downlink data, which arrives along segment s, to old base station BSp along segment k, and directs it to new base station BSq through segment l. Before transmitting the actual data to be transmitted, mobile representative MR transmits reply message 23 which is forwarded to the mobile unit as ack message 24 by base station BSq. At the same time, the new base station creates a temporary FIFO buffer (first in, first out) 25 for storing the downlink data that comes from mobile representative MR. It is not until mobile unit MU believes it has received all the downlink data which had been directed from mobile representative MR via segment k to old base station BSp before switching the connection to segment l, that it transmits done message 26 to new base station BSq and starts to transmit uplink data. As a response to done 26, new base station BSq starts sending downlink data (by first unloading buffer 25) and, for its part, finishes the handover by sending complete message 27 to mobile representative MR.

The connection from mobile representative MR to old base station BSp can be terminated by using a ready message immediately after the data transfer connection of segment k has been broken off (arrow 28), or once ready message 27 has arrived (arrow 29). For the sake of clarity, FIG. 2 presents the interrupt time of the uplink data, represented by a shaded bar, the interrupt time of the downlink data in mobile representative MR, represented by a black bar, and the interrupt time of the downlink data in new base station BSq, represented by a white bar.

According to Biswas, the handover without a notice comprises several similar procedures, but disruptions in data transmission can be longer because delay is caused in the time spent before a break is detected in the connection passing through the old base station. In both the arrangements, the one with a notice and the one without a notice, it is possible that there is packet loss or packet misordering. In the case of uplink data, it is possible that mobile representative MR breaks off the data transmission from segment k to the network before all the uplink cells have been transmitted across segments i and k. After the connection is terminated, the cells in question are considered lost, or if they are still directed to the network, they can be out of order in the uplink. The downlink cells, which have been directed to segments k and i before the handover, may be lost altogether because of a weak radio link, or they can arrive late in mobile unit MU, causing out-of-ordering in the downlink.

Packet loss and out-of-ordering usually results in that an erroneous checksum or other indicator is detected on a higher protocol level, whereby a given protocol data unit (PDA) comprising several cells is denied and requested to be sent again. This is uneconomic from the point of view of the network resource utilization.

Patent publication EP 426 269 to British Telecommunications discloses a method in which the base stations are assembled in groups of several base stations. To facilitate and speed up the handover, all the cells directed to a mobile unit in the transmission range of a given base station are sent to all the base stations of the same group by means of the data transmission network. The publication presents an idea according to which the old base station sends all the cells delivered to it, and after this, the new base station starts sending the cells delivered through it. The publication also presents a predictor which is incorporated in the base station controller or in the mobile representative that controls the base stations. The task of the predictor is to monitor the movement of the mobile unit from one transmission range to another and to estimate as to where the mobile unit will migrate next. This is effected in order to decrease the amount of cells sent unnecessarily to the remotest base stations of the group. However, the solution cannot maintain packet ordering or prevent packet loss because the old and the new base stations cannot tell precisely which cells have been transmitted and received correctly immediately before or after the handover.

Patent publication EP 366 342 to AT&T discloses a method in which data is transmitted as cells in a cellular radio network and the header segment of each cell comprises an unchanging segment which remains unmodified regardless of the changes in routing, and a changing segment whose contents vary during a handover or during other rerouting processes. The publication suggests that the arrangement can be used to facilitate the handover, but only the definition of the routing is benefited. A similar method is disclosed in patent publication EP 577 959 to Roke Manor Research Ltd., relating to the ATM network in particular. In this case, the unchanging segment in the cell header is a so-called VCI field (Virtual Channel Identifier) and the changing segment is a so-called VPI field (Virtual Path Identifier). Neither one of the publications discloses a method which could ensure that packet ordering remains the same and/or which could prevent packet loss during the handover.

Patent publication EP 577 960 to Roke Manor Research Ltd. discloses a method in which at least one of the base stations of a cellular network is affiliated, through the ATM network, with at least two mobile representatives which, in the disclosed arrangement, also function as repeaters between the ATM network and a fixed telephone network. The idea is to arrange the VPIs and the VCIs of the ATM network which control the routing so that even though a given mobile unit moves into the transmission range of another mobile representative (or mobile services switching center), the routing is implemented by linking via the original mobile representative. The arrangement has some advantages in decreasing the amount of switchings in the network but it does not have an effect on packet loss between the base stations and the mobile unit and/or on the delay of cells during a handover.

The article "BAHAMA: A Broadband Ad-Hoc Wireless ATM Local-Area Net-work", Proc. ICC '95, Jun. 18–22, 1995, Seattle, written by K. Y. Eng et al., discloses a method in which the GFC field in the header segments of ATM cells is used to implement cell-oriented sequential numbering. The purpose is to contribute to the synchronization and combination of steams of cells that arrive at a given conjuction point along two parallel routes. The purpose in numbering the cells is aimed particularly at identifying them unequivocally, so that cells are not duplicated or lost when the streams of cells are combined and their order will remain the same. In this case, a problem might occur because only numbers from 0 to 15 can be presented in the GFC field which has a maximum of four bits, whereby the numbering cycle remains so short that cells with the same number belonging to subsequent cycles may become out-of-ordered.

OBJECTS

The object of the present invention is to provide a method that diminishes the likelihood of packet loss and out-of-ordering in a radio interface during a handover. Another object of the invention is to present a data transmission system comprising a means of preventing or decreasing packet loss and out-of-ordering during the handover. Another object of the invention is that the method and system disclosed do not require major changes in the specified ATM and B-ISDN systems.

The objects of the invention are accomplished by a method which can be used to refer to the cells of the system with an accuracy of at least a given number of cells, so that the base stations can exchange information on which cells have been sent and/or received successfully during the handover.

SUMMARY OF THE INVENTION

The method according to the invention for performing handover processes in a system that applies cellular data transmission and comprises a switch, a first and a second base station and a mobile unit, is characterized in that the first base station provides the switch and/or the second base station with information on which cells have been successfully transmitted between the first base station and the mobile unit, so that the transmission of cells continues between the second base station and the mobile unit, beginning with the first cell that has not been successfully transmitted between the first base station and the mobile unit.

The invention is further related to the base station of a wireless data transmission system. The base station according to the invention is characterized in comprising a means for dispatching information to other base stations on which cells have been transmitted successfully and in the right order between the base station and the mobile unit, and a means for receiving the corresponding information from the other base stations.

The invention is further related to a data transmission system. The data transmission system according to the invention is characterized in comprising a means for transmitting messages between the base station on the cells of the transferred cellular data.

The invention is based on the insight according to which the base stations may well exchange data on the success of the transmission and/or the reception of cells, even though the specifications of the data transmission system do not support the reference to discrete cells per se. In this case, synchronization mechanisms can be provided in a manner described below, by means of which the old and the new base stations participating in the handover share information on which cells have been successfully transmitted to the mobile unit and/or received from there. On the basis of the successful transmission of cells, the point in the stream of cells from where the transmission is to be continued can be indicated to the new base station. In addition, the cells that were not transmitted and/or received via the old base station can be designated to be sent and/or received through the new base station.

In the following, the ATM system is dealt with as an exemplary object of application of the invention, the system being characterized in a high data transfer rate, the relatively small size of cells, and the small number of available cell header fields which is due to stringent specifications. However, it will be appreciated by those skilled in the art that the invention can also be applied in other data transmission methods and systems whose specifications do not support the reference to discrete cells per se and/or in which it is important not to lose any cells and to maintain their relative order.

The direction of the data transmission from the network through the base station to the mobile unit is called downlink, according to the established practice, and the opposite direction is called uplink. The old and the new base stations participate in the handover. Downlink data is transmitted through the old base station until the moment of the handover, after which the old base station informs the new one that it has terminated downlink data transmission and sends those buffered cells that had perhaps not been transmitted, to the new base station or informs it about which cells are involved. The latter situation applies when the base stations have received the same cells from the network as a preliminary procedure for the handover. Similarly, the uplink data is transferred through the old base station until the moment of the handover and, after the handover, the old base station sends a message of terminating the uplink data transmission. The base stations can receive the same cells from the direction of the mobile unit as a preliminary procedure for the handover. In this case, the old base station informs the new one as to which uplink cells have been forwarded, so that the new base station will not send the same cells again. The handover on uplink and downlink data transmission does not necessarily occur simultaneously in the method according to the invention.

The cells of the exemplary ATM system comprise four header field bits whose use is defined so freely that they are available for the implementation of the cell reference system. Taking into account the shortness of the cells and the rapidity of the ATM system, it is not practical to number all the sequential cells with a serial number of four bits because the numbering, in any case, winds back to zero after every sixteenth cell. A fast repeating of the counter cycle might cause confusion as to which of the sequential cycles is in question. Instead, a counter can be implemented whose value deviates from zero only in one cell per group of cells of a given length, whereby a given value of the counter can be used to refer to the whole group of cells, and discrete signaling can even be used to designate one cell in the group.

BRIEF DESCRIPTION OF THE DRAWINGS

In the following, the invention is described in detail with reference to the preferred embodiments presented as examples and to the appended drawings in which.

DETAILED DESCRIPTION OF THE INVENTION

Reference was made above to FIGS. 1 and 2 in connection with the description of prior art. Therefore, in the following description of the invention and its advantageous embodiments, reference is made mainly to FIGS. 3a–8. Identical reference numbers are used in the figures for corresponding parts.

First, a cell reference process according to an advantageous embodiment of the invention is described with reference to FIGS. 3a and 3b. The header of an ATM cell comprises, as known by those skilled in the art, four so-called GFC bits, (Generic Flow Control) which are defined so that they can be used to implement a cell reference counter according to the invention. Cell flow 30 is divided into groups, of which groups 31, 32, 33, and 34 are presented in FIGS. 3a and 3b, comprising four cells each. The invention does not actually require the groups to contain an equal number of cells or to be in sequential order, but the size of the groups may vary and they can overlap in different ways in the cell flow. However, it is easiest to understand the invention in the form presented in FIGS. 3a and 3b.

The first cell of groups 31–34 (the right-hand cell in the FIGS.) is a so-called counter cell, whereby its GFC bits (not shown separately in the FIGS.) contain a serial number which, presented as a number in the decimal system, is no less than 1 and no greater than 15. The GFC bits in the other cells of the groups are zeros or the same as in the first cell of the group. The number in each cell in the figures presents the value of the GFC bits of the cell in question. The detection of the first cell of the group can be facilitated by setting the GFC bits to zeros in all other cells except the first cell of the group. A given value of the counter bits is understood to refer to the entire group of cells. A reference can be made separately to a given cell within the group by stating which cell is in question as counted from the beginning of the group. The cells themselves do not have any knowledge of which cell in the group is concerned, so a reference to the number N cell within the group can only succeed if none of the N-1 first cells of the group have been lost and if the place of the cell that is referred to in the group has not changed. Both prerequisites are properties that are already required by the ATM system, and hence they do not impose unreasonable additional requirements on the reliability of the system.

Figure 3A:
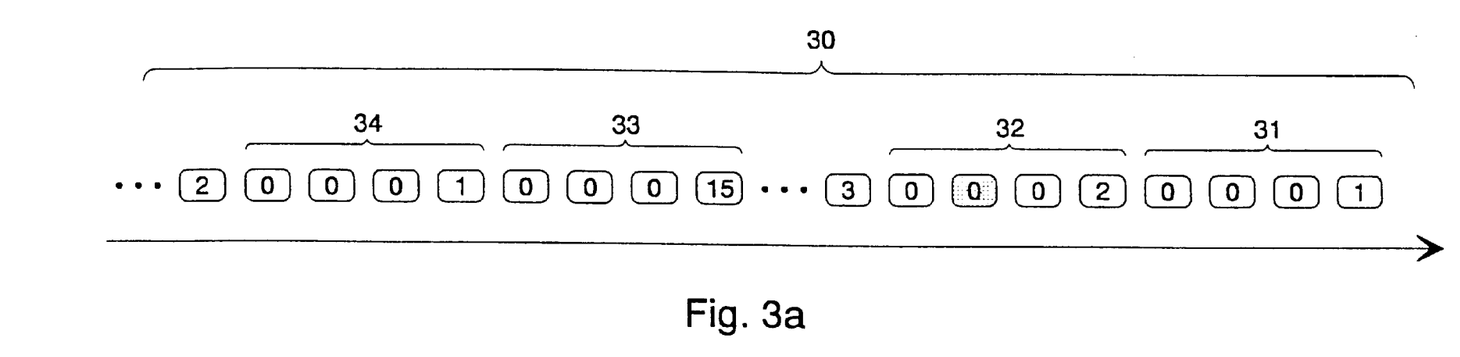
FIG. 3a presents a given cell reference process according to a preferred embodiment of the invention.
Figure 3B:
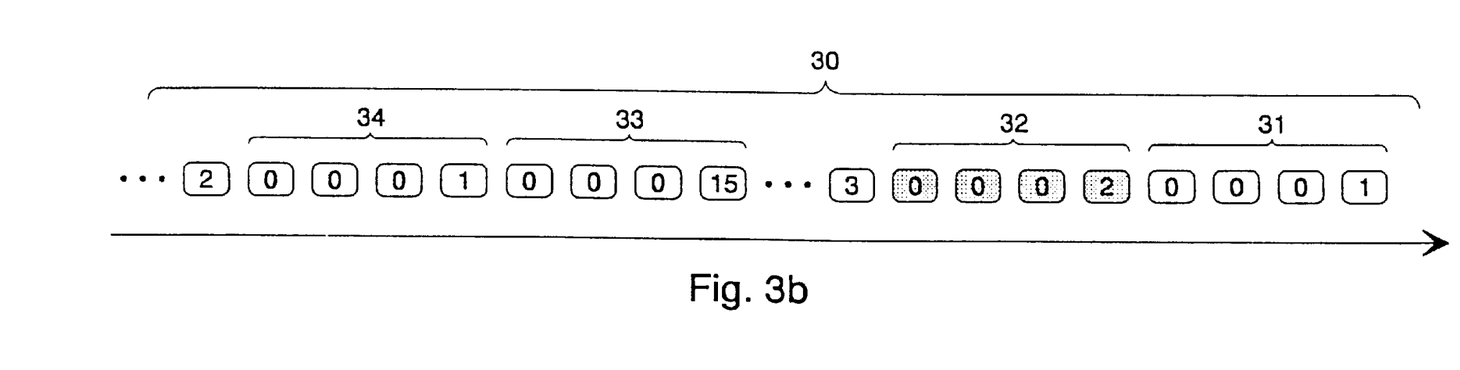
FIG. 3b presents a reference to a group of cells in the process according to FIG. 3a, FIG. 4 presents the affiliation between a base station and a mobile unit in the method according to a preferred embodiment of the invention.

FIG. 3a presents a shaded cell which is identified by means of the definition 'counter=2, third cell'. In FIG. 3b, the entire group of cells is referred to by means of the definition 'counter=2'. Since there are several cells in the group, the resetting of the counter to the beginning (cf. groups 31 and 34) takes a great deal longer than if each cell is numbered separately with a serial number from 0–15. The group-oriented numbering decreases the risk of confusion which is otherwise caused by the relatively short cycle of the reset of the counter and by the fact that there can be several hundred cells simultaneously in a given buffer.

It is not necessary to use GFC bits in particular to implement the counter. If certain conditions are met, it is possible to allocate some bits in the VPI and/or VCI fields for this purpose. Furthermore, it is possible to place, in the cell flow, special counter cells which use the payload to indicate the value of the counter.

In the following, traffic according to a preferred embodiment of the invention between a given base station and a mobile unit with which it is affiliated is described with reference to FIGS. 4 and 5. Several acknowledgment methods are known in prior art which attempt to ensure that each segment of data that is transmitted in parts is sent successfully to the receiving device. These methods are often either so-called selective methods or methods of the go-back-N-type. The former implies that if the transmitting device sends ten packets, for example, of which the receiving device handles successfully all but the seventh one, it requests, in the form of an acknowledgment, the transmitter to send only the seventh packet again. In a go-back-N-type method, the receiver requests the transmitter to start the entire transmission again starting from the seventh packet. In the case presented in FIG. 4, any acknowledgment method can be applied between base station 40 and mobile unit 41 during normal traffic. When a handover is imminent, a special acknowledgment message that describes the last successfully-received cell of the sequence is activated in addition to or instead of the acknowledgment method.

FIFO buffer 42 is provided in base station 40 between ATM protocol level 40a and MAC protocol level (Media Access Control) 40b. Sequential downlink ATM cells can be stored in the FIFO buffer. They are sent one by one to mobile unit 41 which acknowledges the successfully-received cells. The acknowledgment messages are abbreviated ACK (Acknowledge), according to general practice, and the lack of an acknowledgment message or a message that indicates an unsuccessful reception is abbreviated NACK (No-Acknowledge). A number or another identifier is added to each acknowledge message or no-acknowledge message, indicating the cell whose reception it is related to. This numbering is defined in the traffic protocol between the base station and the mobile unit and it does not necessarily have anything to do with the identification of ATM cells beyond the connection between base station 40 and mobile unit 41. The numbering does not even have to refer explicitly to given ATM cells, if the traffic between base station 40 and mobile unit 41 is performed in frames that are greater or smaller by one ATM cell. However, it is important from the point of view of the invention that base station 40 is able to determine explicitly, one way or another, with the aid of acknowledge messages ACK, NACK, which cells have been received successfully by mobile unit 41.

Mobile unit 41 comprises a FIFO buffer 43 of downlink ATM cells between the ATM and MAC protocol levels. Cells are delivered from buffer 43 to the ATM level only after they have been acknowledged in the order of reception. Downlink ATM cells come from the network to FIFO buffer 42 of the base station and they are sent, between MAC levels 40b, 41b, to FIFO buffer 43 of the mobile unit. FIG. 4 presents mobile unit 41 which receives successfully cells 1 and 2 and acknowledges them, whereby they are cleared from both FIFO buffers, though in different senses: the clearing from buffer 43 of the mobile unit means that the cell is transferred to ATM level 41a, but the clearing from buffer 42 in the base station means that the cell is deleted. The reception of cell 3 fails, and hence it does not appear in buffer 43 of the mobile unit and it cannot be cleared from buffer 42 of the base station. The reception of the fourth cell succeeds but it cannot be cleared from buffer 42 of the base station because the third cell has not been cleared. The fourth cell is not delivered to ATM layer 41a in mobile unit 41 because the third cell was skipped from therebetween. A handover is effected after this, where the mobile unit sends to the base station a LAST(2) message that describes the last successfully-received and forwarded cell.

Figure 5:
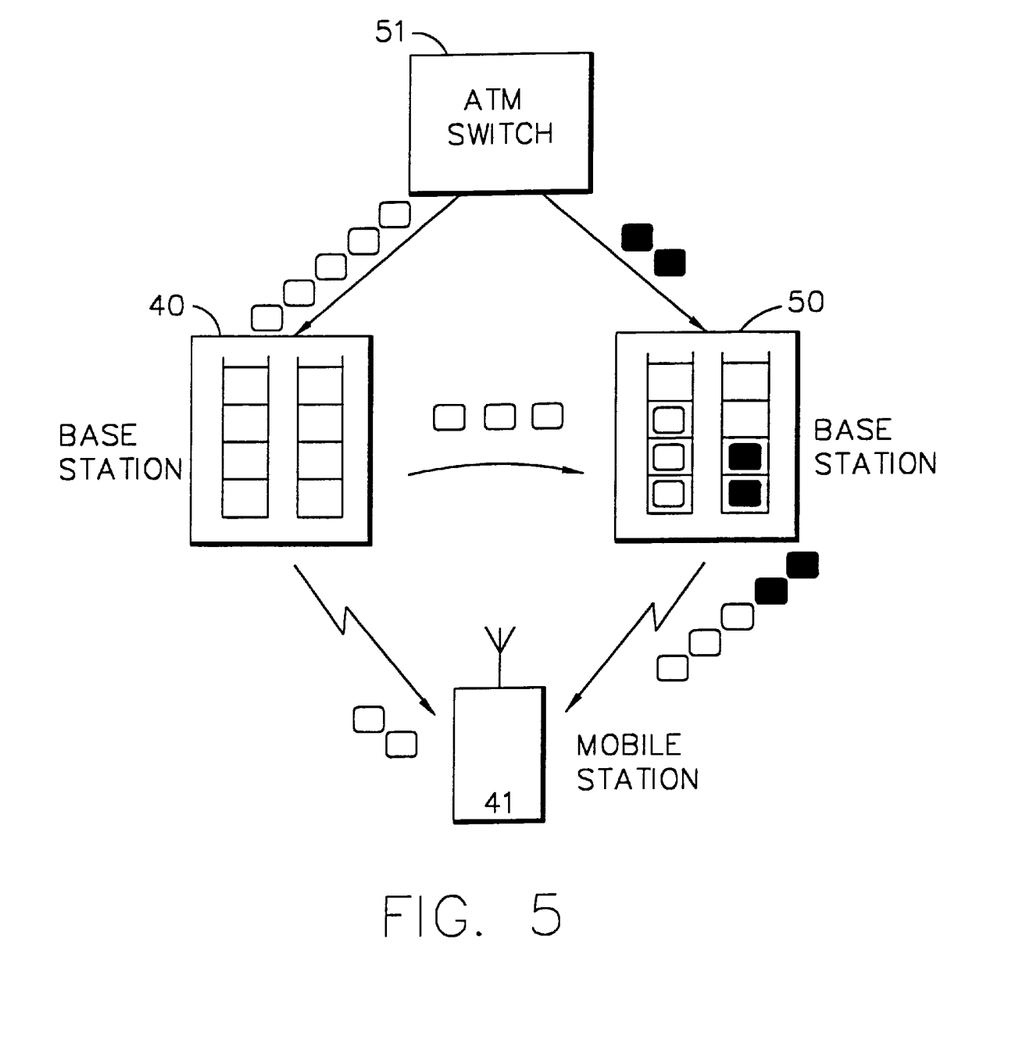
FIG. 5 presents the affiliation between the old and the new base stations and an ATM switch in the method according to the embodiment of FIG. 4.

As a response to the LAST message and to the signaling data on the handover that indicate the new base station, old base station 40 transmits to new base station 50 the cells that were in the FIFO buffer, in the manner presented in FIG. 5. FIG. 5 also presents ATM switch 51 which communicates with said base stations 40 and 50. After the handover, ATM switch 51 directs the ATM cells sent to mobile unit 41 to new base station 50; but before they are sent to the mobile unit, the new base station receives from old base station 40 the three cells that were in its FIFO buffer and transmits those. The ATM cells need not to be identified separately in the traffic between base stations 40 and 50 and ATM switch 51, as long as the base stations continue, in the manner described above, to recognize which cells have been received successfully and in the right order in the mobile unit, and which cells are 'old', i.e., cells that were transferred from elsewhere as untransmitted cells, and which cells are 'new', i.e., cells that were received directly from ATM switch 51. All cells are directed sequentially from the ATM switch either to the old or to the new base station, and all the cells that the mobile unit was unable to receive successfully in the right order through the old base station are forwarded in the right order from the old base station to the new one to be transmitted before those cells that were directed to the new base station originally. In this way, it is possible to avoid packet loss and out-of-ordering during handover.

Referring to FIG. 5, it is to be noted that the ATM switch 51 presented in the figure does not need to have a direct wired connection to the base stations 40 and 50 but it can be located at a longer distance in the network. In this case there can be other switches and nodes of the network between the ATM switch and the base stations. Moreover, the data transmission between base stations 40 and 50 is not necessarily performed directly.

Figure 4:
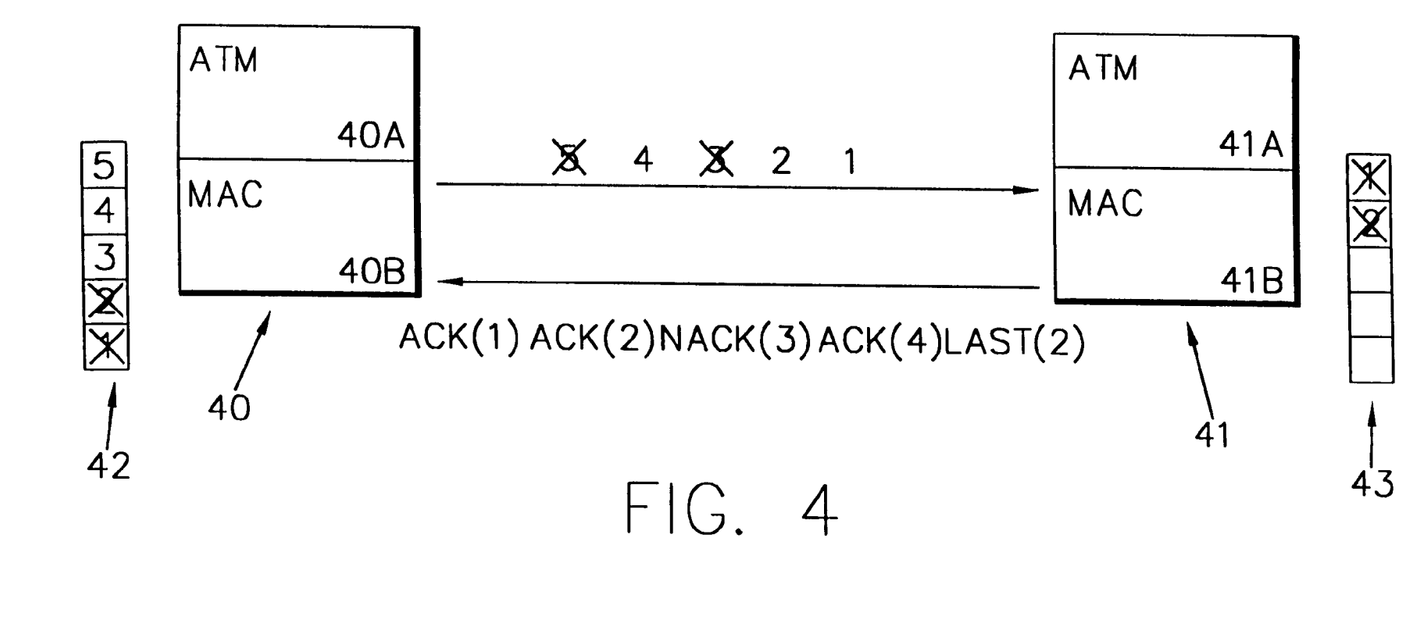

Essentially, the handling of uplink cells in the embodiment of FIGS. 4 and 5 is effected as a mirror image of the handling of downlink cells. Mobile unit 41 comprises a transmission buffer (not shown separately in the figures) from which the transmitted ATM cells are cleared only after the old base station has sequentially acknowledged to have received them correctly. Since the wired connections between base stations 40 and 50 and ATM switch 51 are very reliable compared to wireless connections, it is fairly certain that the cells are transmitted with reasonable reliability from the base stations to the ATM switch. During a handover, the mobile unit transmits, through the new base station, all the cells that have not yet been cleared from the transmission buffer. To synchronize the cells received from the old and the new base stations, ATM switch 51 can comprise or use the method described in Finnish patent application "The Use of Header Fields of ATM Cells in Wireless ATM Data Transmission." (Applicants: Nokia Mobile Phones and Nokia Telecommunications, Inventor: Kristian Rauhala) which was filed simultaneously with this application.

Figure 6:
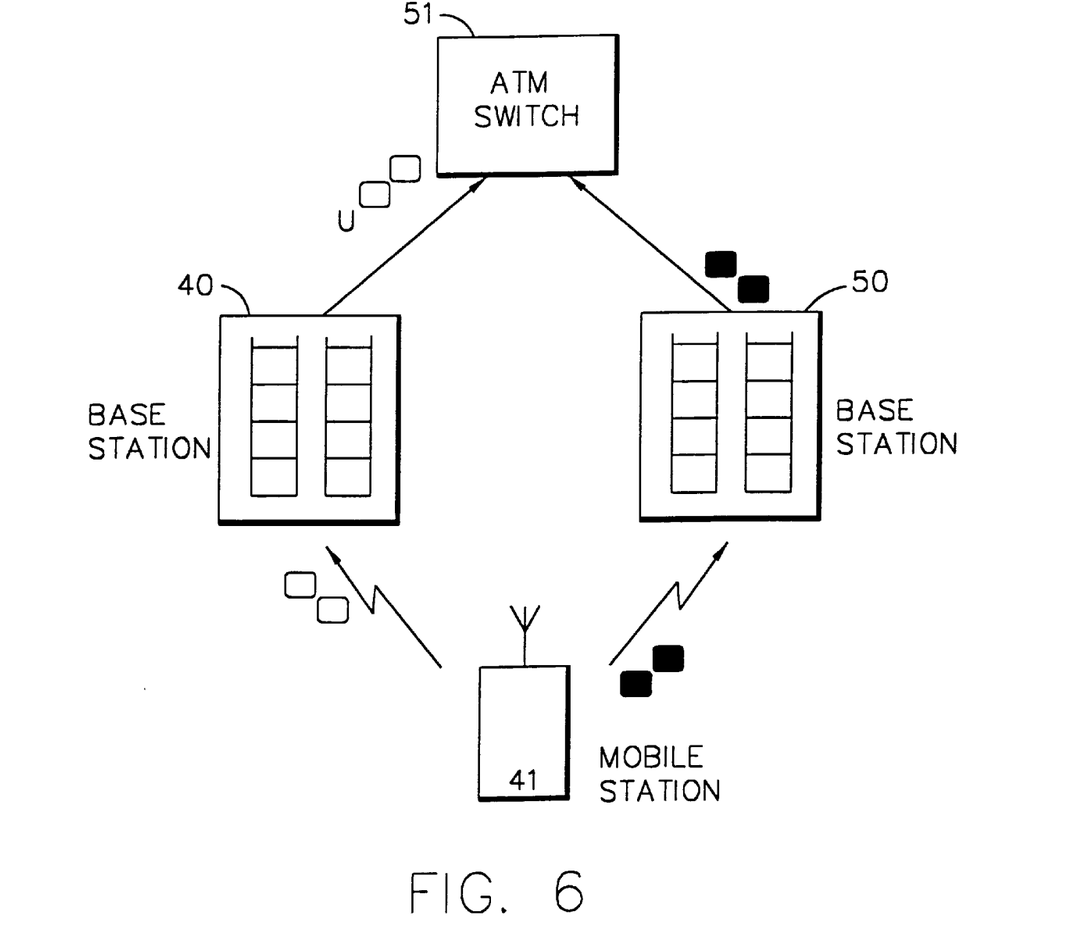
FIG. 6 presents the affiliation between the ATM switch, two base stations, and a mobile unit, according to another preferred embodiment of the invention.

In the following, another preferred embodiment of the invention is described with reference to FIGS. 6 and 7. Old base station 40 first sends to ATM switch 51 the uplink cells it has received in a normal manner. When the radio link to mobile unit 41 is lost, old base station 40 reports this to ATM switch 51 by means of a special UpReady message which is designated the letter U in FIG. 6. The purpose of the message is to tell the ATM switch that no more cells will be transmitted through old base station 40. Message U may be an ATM message cell of a specific type, it can be incorporated in the header of a data cell, or it can be transmitted as some other type of signaling between base station 40 and ATM switch 51. The same message can be transmitted as such to new base station 50 or base station 50 can be permitted by means of other type of signaling, to transmit cells received from mobile unit 41 to ATM switch 51. The U message cannot be sent from old base station 40 until after the last successfully-transmitted uplink cell and it has to be bound to the cell flow in such a manner that there is no risk of the cells transmitted by new base station 50 from preceding, in the sequence of transmission, the cells sent by old base station 40.

Figure 7:
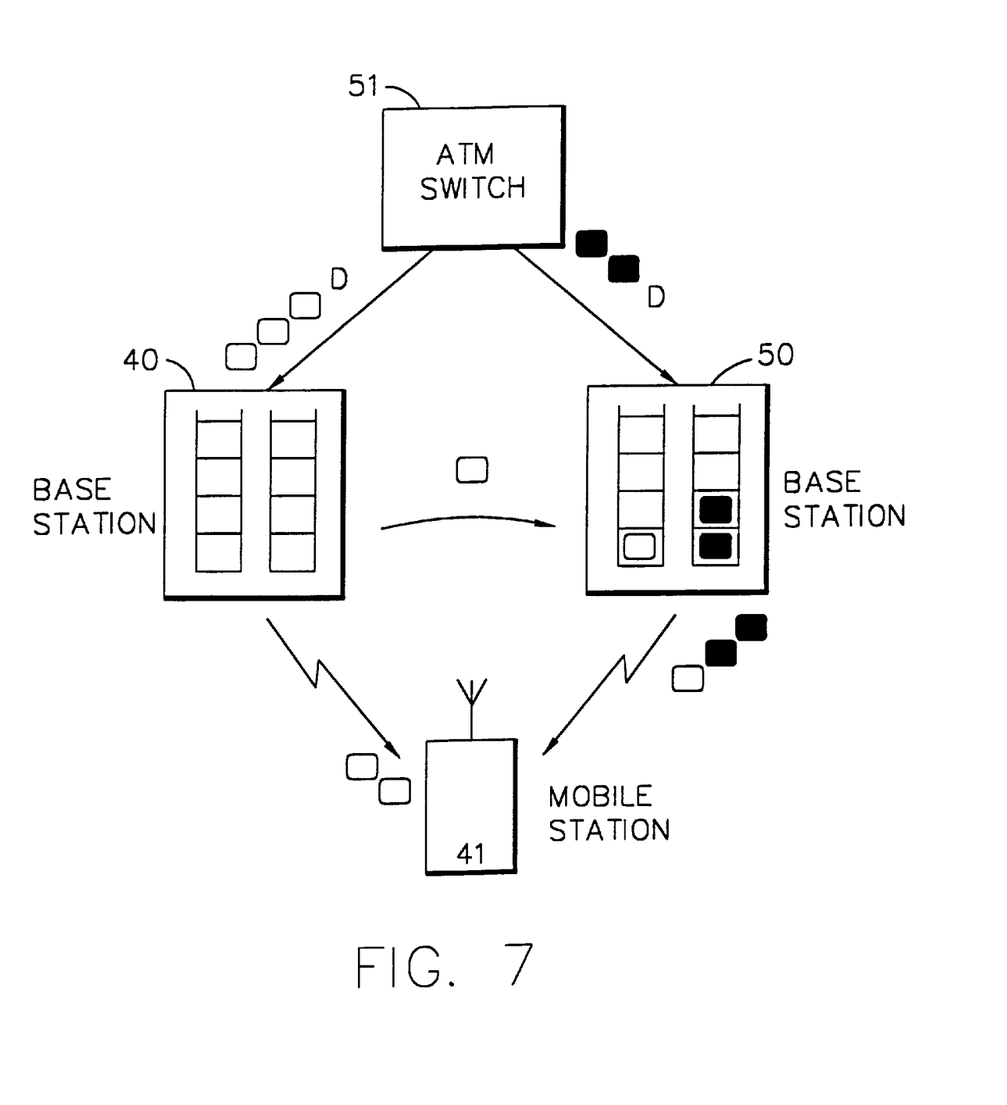
FIG. 7 presents downlink communication in the embodiment of FIG. 6.

FIG. 7 presents an equivalent procedure for downlink signaling. The idea is that ATM switch 51 decides from which point it starts directing downlink cells to new base station 50 instead of old base station 40. The last cell sent to old base station 40 is indicated by a so-called DownReady message which is designated D in FIG. 7. To maintain the order of the cells, it is important that message D is bound to the cells of the downlink cell flow. It can be, e.g., a given ATM message cell (such as an RM, Resource Management cell), or it can be included in a field in the header of the last data cell. The same or a corresponding message D indicates the first cell of the cells transmitted to new base station 50. Old base station 40 attempts to send all the cells received before message D to mobile unit 41. For identifying the successfully-transmitted cells, a procedure similar to the one described above with reference to FIG. 4 can be used, or a method similar to the one described with reference to FIGS. 3a and 3b. If old base station 40 is unable to send all the cells sequentially, it transmits the cells left in the transmission buffer to new base station 50. Finally, it transmits a message indicating that the downlink trans-mission buffer is empty; the message can be the same as message D. New base station 50 first sends the cells received from the old base station and only after that the cells that have come directly from ATM switch 51. The synchronized location of messages D in the cell flow directed to both the old and the new base stations guarantees that downlink cells are not lost and their sequence does not change.

In the following, another preferred embodiment of the invention is described with reference to FIG. 8. As a distinction to the one described above, this embodiment presents a principle according to which the mobile unit decides the handover moment in the downlink data transmission. It is assumed that mobile unit 41 is moving from the transmission range of old base station 40 to that of new base station 50, which has been observed in the cellular system in a manner known per se. Now ATM switch 51 starts to duplicate downlink cells and sends them as cell flows to both base stations. The idea is that the base stations store the cells they receive in FIFO transmission buffers 42 and 52 which can be reset. Only one base station (that is, the old base station 40 first) sends cells to mobile unit 41 which acknowledges the cells received successfully and in the right order. If successful communication through the old base station continues for long and more and more cells arrive, an unreasonably big buffer is required in the new base station. To avoid this, ATM switch 51 adds counter messages into the cell flow, designated letter C and a serial number in FIG. 8. The counter messages have to be fixed in a given place with respect to the cells of the downlink cell flow. They can be, for example, given ATM message cells (such as RM cells, Resource Management) or they can be included in the header of a data cell. Each counter message C1, C2, etc. can be identified uniquely.

After old base station 40 has transmitted successfully and in the right order all the cells that preceded a given counter message C1, it sends a message reporting this to new base station 50 in the form of signaling or in another manner known per se. As a response to the message, the new base station resets its FIFO buffer 52, i.e., deletes from it all the cells received from the ATM switch before counter message C1. This is repeated until mobile unit 41 does not acknowledge sequentially that it has received a given cell through the old base station. Old base station 40 then informs the new one as to where in the transmission it left off, by means of a message such as: '13th cell as counted from counter message C2 has not been sent'. New base station 50 deletes counter message C2 and the next 12 cells from transmission buffer 52 and starts transmitting from the 13th cell.

The method used to uniquely identify counter messages C1, C2, etc., is not essential to the invention. As indicated in the name, the counter messages can comprise a serial number with a fairly long repetition cycle so as to avoid confusion. By including the counter messages in ATM cells of a normal form, the advantage is achieved that they can be buffered by the same means as the data cells. In addition, the general specifications of the ATM system ensure that the place of the counter messages in the cell flow does not change.

Figure 8:
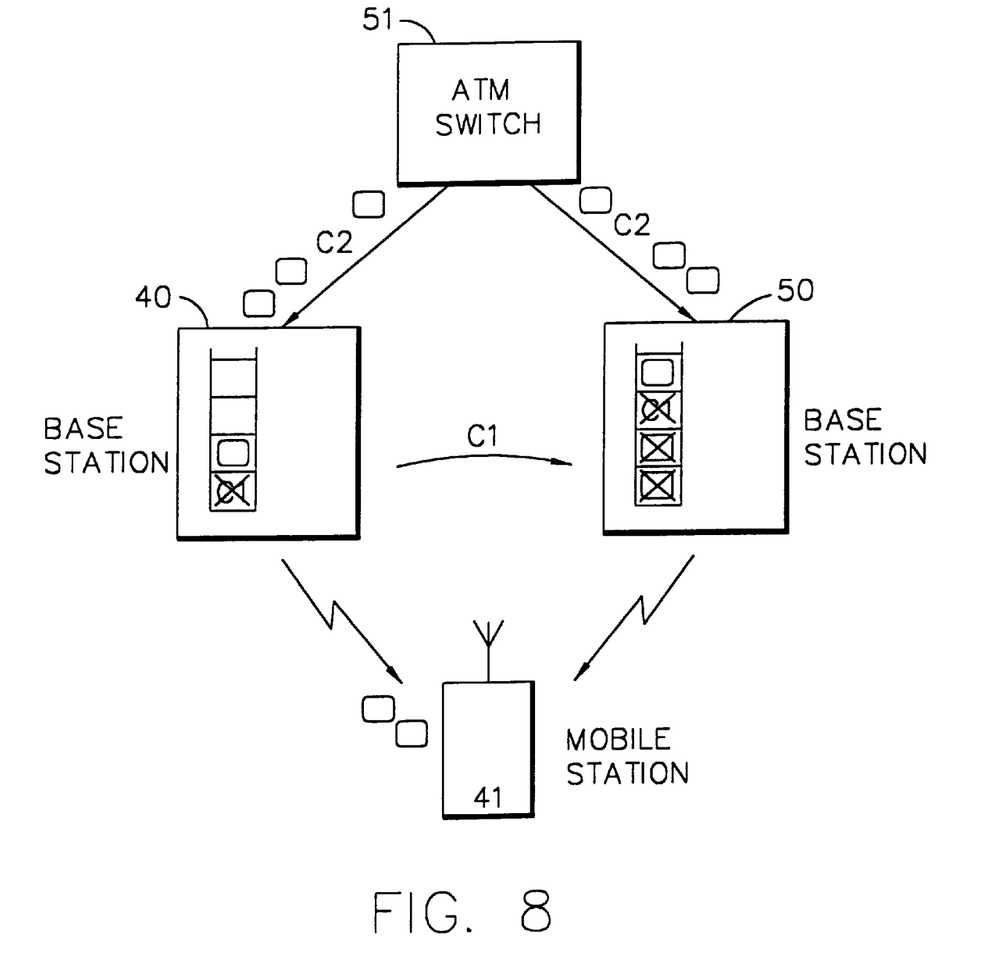
FIG. 8 presents downlink communication in another embodiment of the invention.

The uplink communications in the embodiment presented in FIG. 8 can be implemented as a mirror image of the downlink communications, whereby both base stations 40 and 50 receive cells sent by mobile unit 41, but only one of them forwards the cells to ATM switch 51. Consequently, the counter messages are formed in mobile unit 41. When the base station with 'the responsibility to send' has sent all the cells received before a given counter message, it notifies the other base station on this and the base station empties its uplink buffer as a response to this information. When the connection between the old base station and the mobile unit is terminated, the old base station informs the new base station as to how many cells have been forwarded since the latest counter message, whereby the new base station continues the data transmission from the corresponding point.

Embodiments of the invention are described above mainly with reference to two base stations. Present cellular systems use methods that can predict the next probable base station of a mobile unit, so this can be reported by means of signaling to the base stations participating in the operation.

However, it will be appreciated by those skilled in the art that the methods described above can also be applied in systems which comprise several probable new base stations, and in systems in which it is not possible to predict the new base station. In these cases, it may be necessary to handle all the new base stations that are tangent to or intersect the transmission range of the old base station as probable new base stations.

Several embodiments are also described above which all present the operation in downlink and uplink communications. It is obvious that the protocols of downlink and uplink communications need not be combined as the pairs presented above but the embodiment of FIG. 8, for example, can be applied in downlink communications, and the embodiment of FIG. 6 can be applied in uplink communications in the same system. Furthermore, the methods according to the different embodiments of the invention can also be applied alternatively in the same system in the same direction of traffic, depending on the quality of the connection to be transmitted or on the load status of the network.

The base station of the radio data transmission system according to the invention comprises, according to the figures, memory or buffer entities 42, 52 for temporarily storing the cells. The memory entities must be controllable so that the cells stored in them can be dealt with separately, for instance, forwarded or cleared from the buffer, and so that a given number of cells at a time can be cleared from them. The relative order of the cells must remain the same for the period of the storing and the memory entities must operate rapidly enough so that cells that are transmitted at a normal rate do not pile up in the base station. The implementation of such memory entities is known as such by those skilled in the art. Furthermore, the base station according to the invention comprises a means for transmitting cell-oriented data to another base station and for receiving data from that base station during handover. As stated above, the cell-oriented data involves either the actual transmission of cells, as in the embodiments of FIGS. 5, 6, and 7, or the transmission of data on a cell which, as counted from a given counter message, was being processed at the time of terminating the radio link between the base station and the mobile unit. The formation, the transmission, and the reception of celloriented data can preferably be implemented as a programmable process carried out by the block that controls the operation of the base station, whereby known components and programming methods are used to implement it.

The radio data transmission system according to the invention comprises at least one switch 51 and at least two base stations 40 and 50 according to the invention, as described above. Mobile unit 41 can also be considered part of the data transmission system because without it the user would be unable to make use of the properties of the system. In the data transmission according to the invention, a data link is provided between the base stations for transmitting cell-oriented data during handover. It is preferable to implement the data transmission as a wired connection and it can be effected directly between the base stations or it can be transmitted through switching device 51.

In the embodiments described above, the handover has been mainly explained with reference to a case in which an individual mobile unit migrates. However, the invention can be implemented, on more general terms, in a data transmission system comprising at least one radio link segment. This means that the mobile unit of the preceding description can actually be a network representative that handles, on the one hand, the wireless connection to the base stations and, on the other hand, the wired connections to the parts of the network that are located in their own subordination. Furthermore, a handover might be necessary for reasons other than the migration of the mobile unit. It can be used, for example, to balance out the load in the different parts of the network or it can be caused by a temporary disruption which weakens the capacity of the old base station.

The mobile unit can, of course, simply be a separate, portable mobile unit. In this case, it most probably consists of a mobile station segment which can be, for example, a mobile phone of a digital cellular network (such as a GSM telephone) or a wireless digital telephone (such as a DECT telephone), and of a computer segment which is in local connection with the said mobile station segment and which can be, e.g., a laptop computer. The said local connection can be a wired connection or an infrared connection.

The invention discloses a method and equipment in which the risk of packet loss and/or of out-of-ordering during handover is diminished to a significantly great extent by means of transmitting, between the new and the old base stations, information on which cells are successfully transmitted and/or received across the radio interface before the handover. The invention can be applied to create an effective ATM network solution that comprises connection segments of which at least one is wireless.

We claim:

1. A method for implementing a handover in a data transmission system that comprises a switch (51) and a first (40) and a second (50) base station that are affiliated with the switch, and a mobile unit (41) that is affiliated wirelessly with the base stations, and wherein the operation of the data transmission system comprises the transmission of data as cells of a given size, and the handover comprises the transmission of said cells of data first between the mobile unit (41) and the first base station (40) and, after that, between the mobile unit (41) and the second base station (50), said method comprising the steps of:

transmitting a flow of said cells between the first base station (40) and the mobile unit (41);

detecting the first cell that is not successfully transmitted between the first base station and the mobile unit and subsequent cells that are not successfully transmitted, to determine which cells have been successfully transmitted between the first base station and the mobile unit; and providing information from the first base station (40) to the switch (51) and/or the second base station (50) on which cells have been successfully transmitted between the first base station and the mobile unit.

2. A method according to claim 1, wherein the transmission of cells between the second base station and the mobile unit starts g from the first cell that is not successfully transmitted between the first base station and the mobile unit.

3. A method according to claim 1, wherein in the first (40) and the second (50) base stations, downlink cells are stored in respective buffers (42, 52) before transmitting them to the mobile unit (41).

4. A method according to claim 3, wherein when transmitting downlink cells from the first base station (40) to the mobile unit, the mobile unit (41) acknowledges the cells received successfully, whereby the downlink cells that are acknowledged as having been received successfully and in the right order are cleared from the buffer (42) of the first base station.

5. A method according to claim 4, wherein during the handover, the downlink cells, which have not been cleared from the buffer (42) of the first base station, are transmitted to the second base station (50) to be sent to the mobile unit (41).

6. A method according to claim 1, wherein the switch (51) adds a first message (D) to the transmission flow consisting of downlink data cells to be transferred, the message (D) indicating the termination of the cells to be transmitted through the first base station (40), and the start of the cells to be transmitted through the second base station (50), whereby the location of the first message (D) is fixed with respect to the downlink cells of said transmission flow.

7. A method according to claim 1, wherein the switch (51) adds counter messages (C1, C2) to the transmission flow comprised of downlink data cells to be transferred, the location of the counter messages being fixed with respect to said downlink cells of the transmission flow.

8. A method according to claim 7, wherein the transmission flow comprises numbering cells having serial numbers, and wherein said counter messages (C1, C2) comprise a serial number that has been added to a given group of numbering cells and that deviates from the immediately preceding serial numbers, and there is, respectively, a predetermined number of cells between said numbering cells, belonging to the group of cells (31, 32, 33, 34) indicated by said serial number.

9. A method according to claim 7, wherein the switch (51) transmits the same cells both to the first (40) and to the second (50) base stations, whereby both base stations store said cells in respective buffers (42, 52), and after the first base station (40) has successfully sent all the cells that preceded a given counter message (C1) to the mobile unit (41), the first base station transmits a second message that reports this to the second base station (50), and as a response to said second message, the second base station clears the corresponding cells from its buffer (52).

10. A method according to claim 1, wherein uplink cells in the mobile unit (41) are stored in a buffer before transmission.

11. A method according to claim 10, wherein when transmitting uplink cells from the mobile unit (41) to the first base station (40), the first base station acknowledges the successfully-received cells, whereby the uplink cells that are acknowledged to have been received successfully and in the right order are cleared from said buffer of the mobile unit.

12. A method according to claim 10, wherein the first base station (40) transmits, during the handover, a termination message (U) to the switch (51), the termination message indicating the termination of the successfully transmitted cells through the first base station (40).

13. A method according to claim 1, wherein the mobile unit (41) adds counter messages to the transmission flow comprised of uplink data cells to be transferred, the location of the counter messages being fixed with respect to the uplink data cells of said transmission flow.

14. A method according to claim 13, wherein the transmission flow comprises numbering cells having serial numbers, and wherein said counter messages comprise a serial number that has been added to a given group of numbering cells and that deviates from the immediately preceding serial numbers, and that there is, respectively, a predetermined number of cells between said numbering cells, belonging to the group of cells indicated by said serial number.

15. A method according to claim 13, wherein the mobile unit (41) sends the same uplink cells to both the first (40) and to the second (50) base stations, whereby both base stations store the uplink cells in respective buffers, and after the first base station (40) has successfully received all the cells that preceded a given counter message from the mobile unit (41), the first base station transmits another message reporting this to the second base station (50) and, as a response to said another message, the second base station (50) clears the corresponding cells from its buffer.

16. A base station (40, 50), of a radio data transmission system having a plurality of base stations, for transmitting data in cell form and in a right order to a switch (51) connected to the base station by means of a wired connection and to a mobile unit (41) which is in radio link with the base station, comprising:

means for detecting the first data cell that is not successfully transmitted between said base station and the mobile unit and subsequent data cells that are not successfully transmitted, to determine which cells have been successfully transmitted between said base station and the mobile unit;

means for delivering to other base stations of said plurality of base stations the data on cells that are transmitted successfully and in the right order between said base station and the mobile unit, and means for receiving the corresponding data from said other base stations.

17. A base station according to claim 16, further comprising a buffer entity (42, 52) for temporarily storing the data in cell form, and a means for selectively clearing cells from said buffer entity.

18. In a radio transmission system comprising a switch (51) for controlling data in cell form, and at least two base stations (40, 50) that are affiliated with the switch, for transmitting the data in cell form between the switch (51) and a mobile unit (41), the mobile unit communicating wirelessly with the base stations, the improvement comprising:

means for detecting the transfer of data in cell form between one of said base stations and said mobile unit and producing information regarding which cells have been successfully transferred; and means, responsive to the information produced by said detecting means, for transmitting messages concerning the successfully transferred cells between the base stations.

* * * * *